June 28, 1955 W. D. HERSHBERGER 2,712,070

METHODS AND SYSTEMS FOR STABILIZING FREQUENCY

Filed Jan. 29, 1949 3 Sheets-Sheet 1

INVENTOR
William D. Hershberger
BY
J. L. Whittaker
ATTORNEY

June 28, 1955 W. D. HERSHBERGER 2,712,070

METHODS AND SYSTEMS FOR STABILIZING FREQUENCY

Filed Jan. 29, 1949 3 Sheets-Sheet 2

INVENTOR
William D. Hershberger
BY J. L. Whittaker
ATTORNEY

June 28, 1955 W. D. HERSHBERGER 2,712,070

METHODS AND SYSTEMS FOR STABILIZING FREQUENCY

Filed Jan. 29, 1949 3 Sheets-Sheet 3

INVENTOR
William D. Hershberger
BY J. L. Whittaker
ATTORNEY

United States Patent Office 2,712,070
Patented June 28, 1955

2,712,070

METHODS AND SYSTEMS FOR STABILIZING FREQUENCY

William D. Hershberger, Princeton, N. J., assignor to Radio Corporation of America, a corporation of Delaware Application January 29, 1949, Serial No. 73,626

14 Claims. (Cl. 250—36)

This invention relates to methods and systems for stabilizing the frequency of oscillators, particularly microwave oscillators such as klystrons, magnetrons and the like.

Precise control of the frequency of an oscillator primarily depends upon obtaining precise frequency information such as provided at microwave frequencies by an absorption line of a molecular resonant gas, or at lower frequencies by a piezoelectric crystal. However, despite utilization of highly precise and stable frequency standards, the oscillator frequency may nevertheless be subject to variation because "the set-point" frequency at which the oscillator is stabilized is subject to variations in operating conditions, such as supply voltage, of control system components which transfer or utilize the precise frequency information. Consequently, in control systems subject to such variations the problem of realizing the available precision of the frequency-standard shifts from one of frequency control to highly precise control of variables other than frequency. To isolate these offending variables and compensate for their effects to better than one part in a million presents a difficult problem which differs for individual control installations, even those of the same type.

In accordance with the present invention, dependence of the oscillator set-point frequency upon operating variables of the control system is avoided by fixing the set-point from two frequency standards, one of which is the resonant frequency of a high Q standard, and the other of which is the frequency corresponding with the point of maximum slope of the output of a differentiator.

More particularly, the variable beat-frequency resulting from mixing of the outputs of the oscillator to be stabilized and a sweep generator is impressed upon a filter to produce a series of pulses containing precise frequency-error as a function of time information; a second series or train of pulses containing precise frequency as a function of time information is produced by scanning the gas cell or other high Q standard with the sweep generator output; and the pulses of one series are differentiated to produce paired pulses of abruptly reversing polarity at the points of their maximum slope. A frequency-control of the oscillator to be stabilized is varied to maintain a fixed time relation of the points of maximum slope of the differentiated pulses to the peaks of the other series of pulses. With such relation maintained, the oscillator is stabilized with extremely high precision, i. e., substantially better than one part in a million.

The invention further resides in systems and methods having the features of novelty and utility hereinafter described and claimed.

For a more detailed understanding of the invention and for illustration of systems embodying and utilizing it, reference is made to the accompanying drawings in which:

Figure 1 is a block diagram of one form of frequency-stabilizing system;

Figures 2*a–e* comprise explanatory curves referred to in discussion of the operation of Figure 1;

Figure 3 comprises explanatory curves referred to in discussion of a coincidence detector included in Figure 1 and other figures;

Figures 1, 2A, 2B, 2C, 2D, 2E, 3:
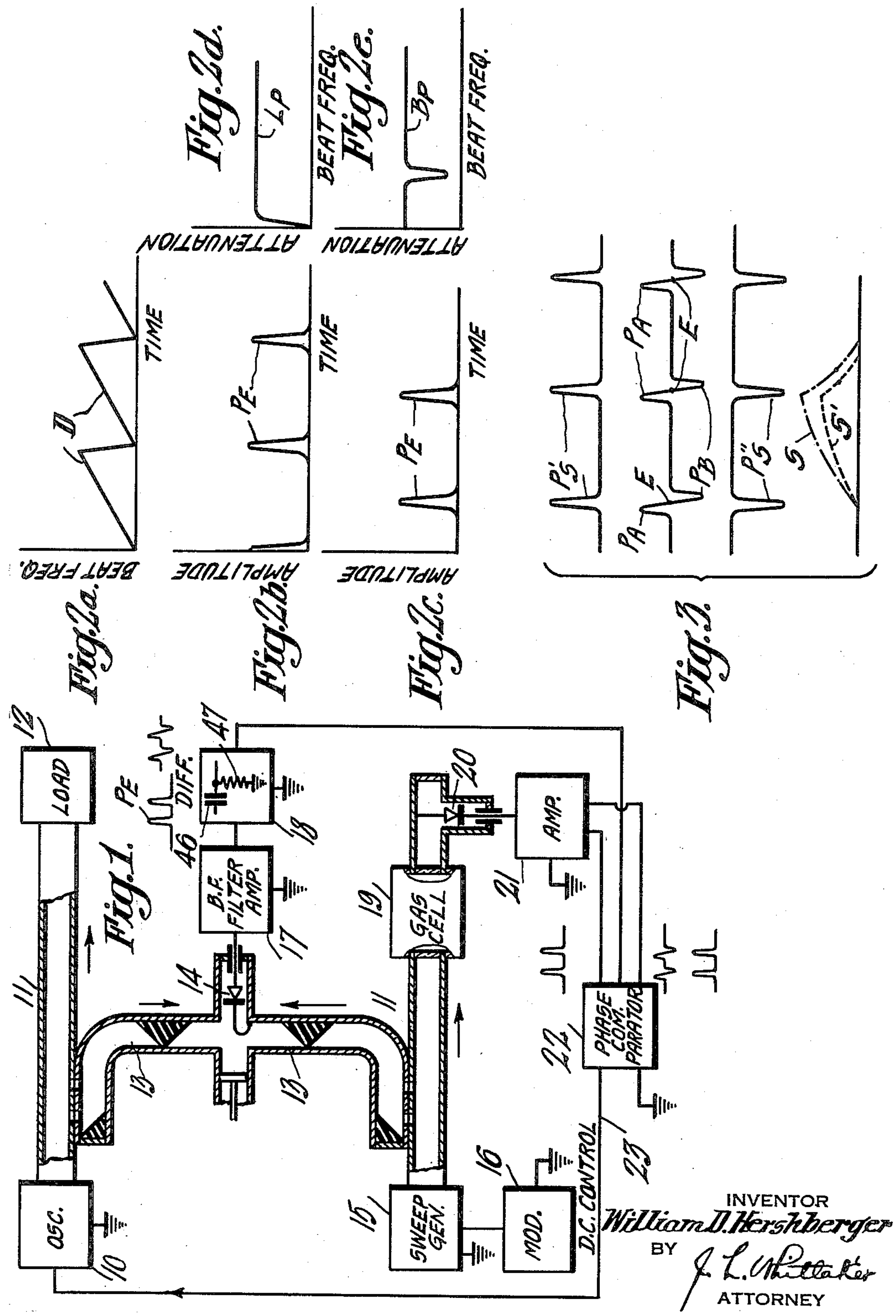

Referring to Figure 1, the block 10 is generically illustrative of an oscillator whose frequency is to be stabilized; for simplicity of explanation, it is assumed the oscillator 10 is a microwave oscillator, such as a klystron or magnetron used as a single generator or in a transmitter of audio or video intelligence. The output of the oscillator is impressed upon a transmission line 11 such as a waveguide or concentric line, for transfer to an antenna, amplifier or other load generically represented by block 12. A portion of the output of oscillator 10 to be utilized for stabilization purposes is impressed upon a mixer 14, such as a diode or crystal rectifier, through a circuit including, in the particular arrangement of Figure 1, a directional coupler 13. Upon the mixer 14 is also impressed the output of a second oscillator or sweep generator 15 whose frequency is periodically varied as by modulator 16 rapidly to sweep over a substantial range of frequencies including the resonant frequency of a standard 19 later described. In the particular arrangement under discussion, the oscillator 15, like oscillator 10, may also be a microwave generator such as a klystron or magnetron. The modulator 16 for varying the frequency of generator 15 may be of any of the electrical or mechanical types used for that purpose; it may, for example, be a sawtooth wave generator as shown on page 183 et seq. of "Ultra High Frequency Techniques" by Brainerd et al. Particular advantages may be derived from the use of particular sweep waveforms. For example, the use of the triangular saw-tooth waveform, described in the Brainerd et al. publication, provides continuous and symmetrical frequency sweeping in both directions which obviates some inherent disadvantages encountered with ordinary unsymmetrical sawtooth sweep potentials.

Again assuming for simplicity of explanation that the modulating wave is sawtoothed, the output of the mixer 14 includes a varying beat-frequency component, represented by curve D of Figure 2, equal to the difference between the frequencies of the oscillators 10 and 15. The width of the frequency band swept by the oscillator 15 is greater than the largest expected deviation of the frequency of oscillator 10, and the range of frequencies swept by oscillator 15 may be located in the frequency spectrum either higher or lower than or may include the operating frequency of oscillator 10. The particular beat frequency, curve D of Figure 2*a*, is based upon the assumption that the sweep range is higher than the oscillator frequency and that the modulating wave is sawtoothed. If the sweep range is lower than or includes the oscillator frequency, or if a different form of moulating wave is used, the shape of curve D will correspondingly differ, but may, of course, be used if desired for reasons which will be understood by those skilled in the art from the subsequent discussion.

The varying beat-frequency output of mixer 14 is converted to pulses $P_E$, having a repetition rate corresponding with the sweep rate of modulator 16, by a filter 17 which may be a resistance-capacitance filter, an inductance-capacitance filter, tuned circuit filter, crystal lattice filter, or other suitable type known in the art. Assuming, for example, the filter 17 is a low-pass filter having the characteristic exemplified by curve $L_P$ of Figure 2*d*, the pulses $P_E$ occur as the beat-frequency passes through zero as shown in Figure 2*b*; on the other hand, if the filter 17 is of the band-pass type having the characteristic exemplified by curve $B_P$ of Figure 2*e*, the pulses $P_E$ occur as the beat-frequency sweeps through the pass-band of the filter as shown in Figure 2*c*. In either event, the train of pulses $P_E$ conveys precise frequency-error as a function of time information.

The output of the filter 17 which may and preferably shall include one or more amplifier stages is impressed upon a differentiator network or device generically represented by block 18. Specifically, the individual pulses $P_E$ of the train produced by mixing the outputs of the oscillators 10 and 15 are each converted to a pulse pair $P_A$, $P_B$, Figure 3, of abruptly reversing polarity. The transition point E of polarity of each pulse pair occurs at the peak of the corresponding pulse $P_E$ and the conversion is without impairment of the frequency-error information. This point E is defined with precision so long as the sweep range and sweep rate are kept within such limits that the C.-R. circuit acts as a time differentiator; namely within such limits that the current through the resistor 47 is determined by capacitor 46 which relation exists if the input wave has negligible harmonic content at frequencies above that given by the relation $$\frac{1}{\omega C}=R$$

The significant point is that within wide limits of a variation of the operating conditions, the change in polarity of the double pulse $P_A$, $P_B$ always occurs at the same frequency of sweep oscillator 15. Thus the output of the differentiator 18 contains precise frequency-error as a function of time information which is not modified or affected by variables unrelated to the frequency deviations of oscillator 10, and including for example substantial changes in the sweep rate or band width of oscillator 15, in the efficiency of mixer 14, and/or in the gain of beat-frequency amplifier tubes or circuits.

For automatic stabilization of oscillator 10, the double-pulse output of the differentiator 18 may be impressed upon one input circuit of a phase-comparator 22 upon whose other input circuit are impressed time/reference pulses produced each time the frequency of oscillator 15 swings through the molecular resonant frequency of gas contained within cell 19.

As more fully discussed in earlier of my copending applications including Serial No. 4497, filed January 27, 1948, the microwave absorption spectra of ammonia, carbonyl sulphide, methyl halides and other gases having a dipole moment comprise "lines" which at low pressures, in the case of ammonia for example, each break up into a plurality of fine sharply defined lines, each of which precisely corresponds with a definite frequency.

The gas line chosen as the precise frequency standard is within the sweep range of oscillator 15 so that for each repetition cycle of sweep oscillator 15, the output of demodulator 20, which utilizes the microwave energy transmitted through cell 19, is abruptly varied to produce a sharp pulse $P_S$. The time of occurrence of a pulse $P_S$ in a sweep cycle of oscillator 15 is rigidly related to a particular frequency of oscillator 15 and therefore any variation of the time relation between the peak of a pulse $P_S$ and the polarity transition point E of the corresponding pulse pair $P_A$, $P_B$ is determined solely by deviation from normal of the frequency of oscillator 10.

In the system shown in my aforesaid copending application Serial No. 4497, sharp pulses were derived from the output of mixer 14 by narrow band amplifier and these pulses were utilized to trigger a sawtooth oscillator so to produce a wave similar to that shown by curve S (or S') of Figure 3. With such system, it was not found feasible to hold the oscillator frequency constant to one part in ten million or better because of effect of variation of the supply voltage of the sawtooth oscillator upon the shape of its output wave. In such system, the set point frequency occurs midway, for example, of the discharge portion of curve S and so is offset with respect to the time of the initiating pulse; actually, the amount of offset is dependent upon such variables as the magnitude of the initiating pulse and the transconductance of the sawtooth tube which cannot readily be precisely controlled. In consequence, as graphically shown by comparison of curves S and S', the variations in set point frequency, due to variations in operating conditions unrelated to frequency-deviation of the stabilized oscillator substantially exceed small frequency errors which the system of Figure 1 can distinguish and compensate for. With the system of Figure 1, like the system shown in copending application Serial No. 68,648 filed December 31, 1948, the precision of control is increased at least by a factor of ten.

By using an electronic switch, the differentiated pulses $P_A$, $P_B$ containing precise frequency-error as a function of time information and the output pulses $P_S$ of the demodulator 20 containing precise frequency as a function of time information may be alternately impressed upon one input circuit of a cathode-ray tube upon whose other input circuit is impressed a sweep voltage derived from modulator 16, in which case the outputs would be presented on the face of the tube substantially as they appear in Figure 3. An operator may manually adjust a frequency-control of oscillator 10 to maintain a predetermined time relation between the peaks of the pulses $P_S$ and the points S of maximum slope of the pulse pairs $P_A$, $P_P$ so to maintain a constant output frequency of oscillator 10. The frequency-control could, as well understood by those skilled in the art, be the voltage-adjusting means for an electrode of the tube, or in the case of the klystron could be a means for adjustment of the cavity size. Such manual control would, however, be most tedious and it is far more desirable to supply the two trains of pulses to a suitable phase-comparator, generically represented by block 22, as automatically to provide to unidirectional frequency-control voltage which varies in accordance with the extent and sense of the frequency deviations of oscillator 10 and which may be applied by control line 23 to oscillator 10 in compensation for such deviations. One suitable type of phase-comparator is shown in Figure 4 and is later herein described.

For automatic control of the frequency of oscillator 10, the amplifier-filter 17, the differentiator 18, the coincidence detector or phase-comparator 22, and the control line 23 are included in or form a feedback loop between the output and input circuits of oscillator 10, which loop is supplied with frequency as a function of time information derived from the molecular resonant gas in cell 19. Accordingly, the stabilized oscillator 10 will strongly resist attempts to modulate its frequency for conveying intelligence at audio and video frequencies and therefore when it is desired to frequency-modulate oscillator 10 for such purpose, recourse may be had to a system such as shown in Figure 4 of my copending application Serial No. 62,626 filed November 30, 1948, now U. S. Patent 2,591,257.

Figures 4, 6:
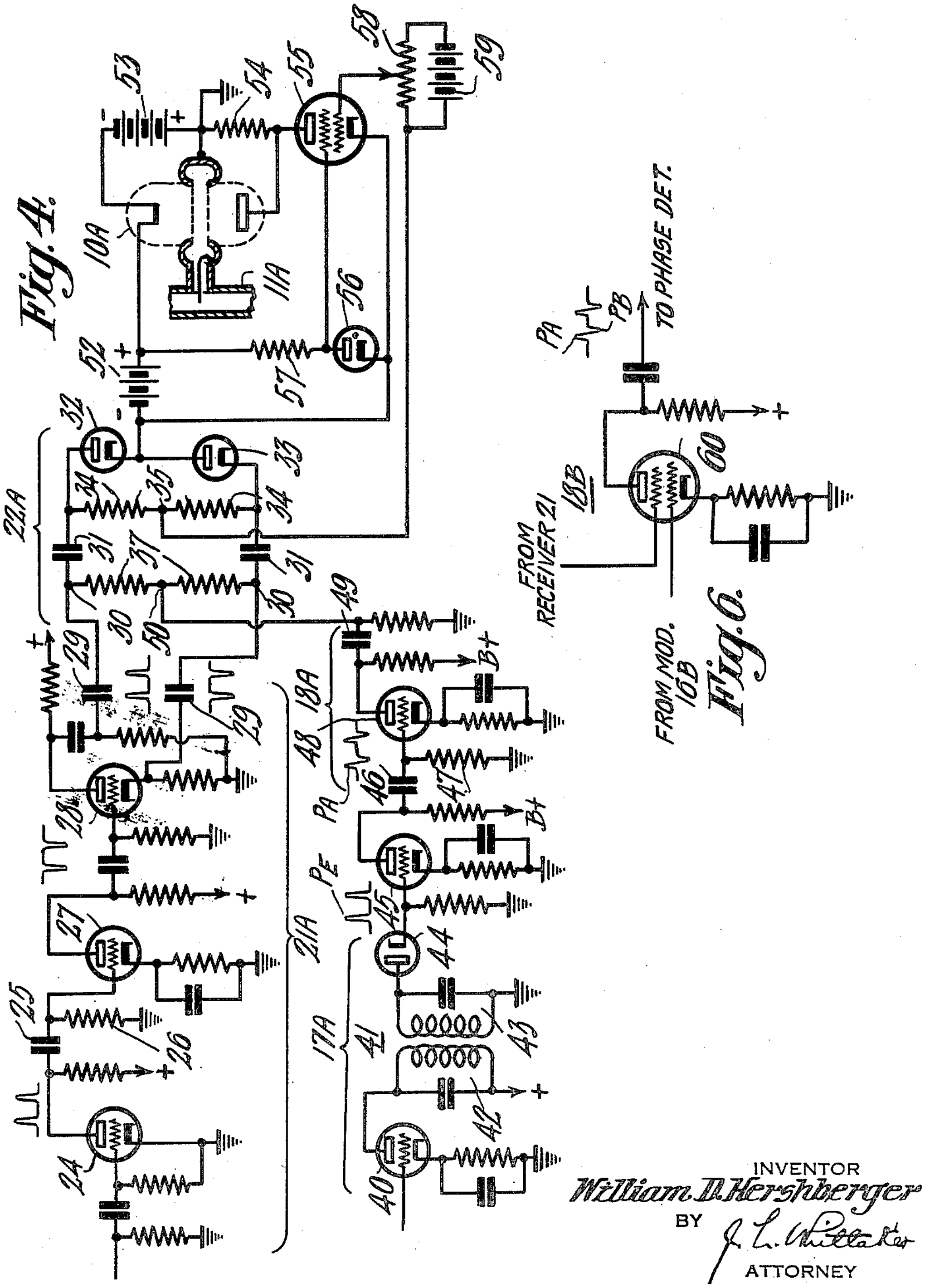
Figure 4 is a schematic circuit diagram of circuit components represented in block in Figure 1 and other figures.
Figure 6 illustrates one type of differentiator network or device.

A suitable amplifier 21 for the output of demodulator 20 of Figure 1 is included within the bracket 21A of Figure 4; specifically, the amplifier tube 24 converts negative pulses to positive amplified pulses which are impressed upon a peaking circuit comprising capacitor 25 and resistor 26. The resulting pulses are in turn impressed upon the grid of a clipper tube 27 to produce sharpened and amplified negative pulses impressed upon tube 28 to provide concurrent pulses $P_S'$, $P_S''$ of opposite polarity which contain, without impairment, the precise frequency-time information of a corresponding pulse $P_S$. Further description of amplifier 21A here appears unnecessary, as such arrangements are per se known, and in any event are more fully described in my copending application Serial No. 6,975, filed February 7, 1948, now U. S. Patent 2,609,654.

Figure 7:
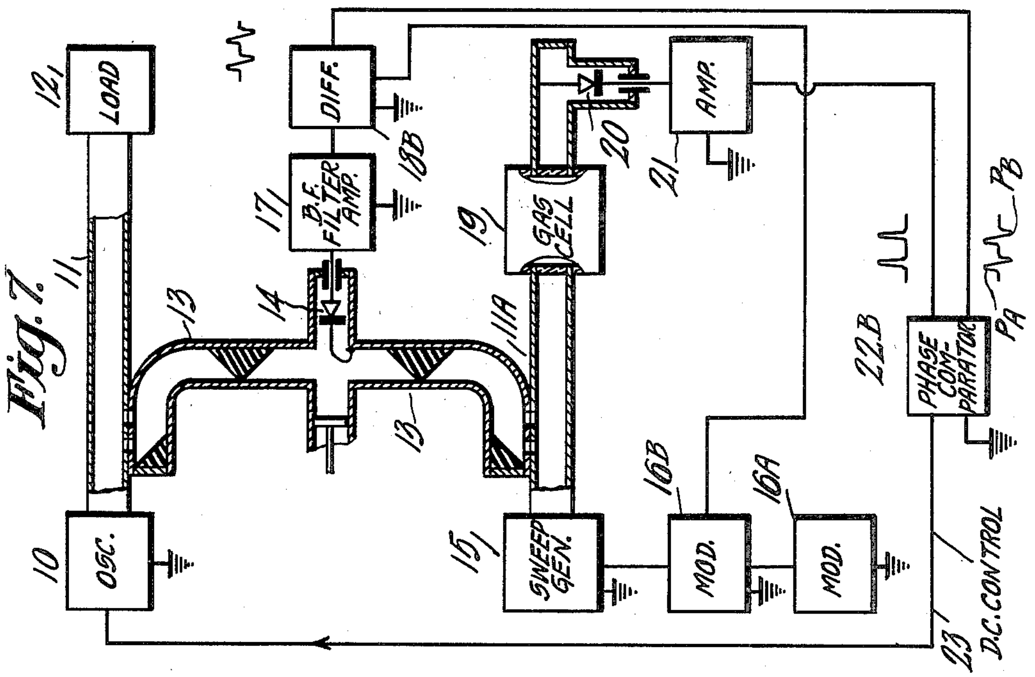
Figure 7 is a block diagram of a still further modification of the invention.

The two trains of concurrent pulses $P_S'$, $P_S''$ so derived from the anode-cathode circuit of the final tube 28 of amplifier 21A are respectively impressed upon the input terminals 30, 30 of a phase-comparator 22A, Figure 4, which in the particular form shown is similar to that of Figure 7 of aforesaid copending application Serial No. 6,975. These pulses are respectively applied to the anode and the cathode of the oppositely poled rectifiers 32, 33 of the phase-comparator. The resistors 34, 34 connected between the anode of rectifier 32 and the cathode of rectifier 33, form a loop for flow of direct current in the circuit including these resistors, the rectifiers and the connection between the cathode of rectifier 32 and the anode of rectifier 33. One of the output terminals 35 of the phase-comparator is connected to the common lead of resistors 34, 34, and the other output terminal 36 is connected to the lead between the cathode of rectifier 32 and the anode of rectifier 33.

The pulse-pair output of differentiator 18 is impressed upon the phase-comparator 22A by connection to the common terminal of similar resistors 37, 37 connected in series between the input terminals 30, 30 of the phase-comparator. As the time relation between the peaks of the pulses $P_S'$, $P_S''$ and the midpoints E of the double pulses $P_A$, $P_B$ departs from the set point relation shown in Figure 3, the direct-current voltage between the output terminals 35, 36 of phase-comparator 22A increases or decreases depending upon the sense of the frequency deviation of oscillator 10 from the set point and to extent dependent upon the amount of the deviation. This varying unidirectional potential may be used to control the frequency of oscillator 10 in any of various known ways, one of which is later herein described.

As exemplary of a filter and differentiator arrangement suited for use in the system of Figure 1, there is shown, in Figure 4, a filter 17A of the resonant circuit type and a differentiator 18A of the resistance-capacitance type. More specifically, the filter amplifier 17A may include one or more amplifier tubes coupled by tuned circuits; for simplicity, only a single amplifier tube 40 is shown, and the frequency-selective coupling means 41 in its output circuit may comprise a pair of circuits 42, 43 tuned, for example, to the nominal mid-frequency of the range of beat frequencies produced by mixer 14. The train of pulses $P_E$ derived from the varying beat-frequency output of the mixer 14 are impressed, after rectification by diode 44 and amplification by tube 45, upon a differentiating circuit comprising the capacitor 46 and resistor 47 in series between the anode and cathode of tube 45. By the differentiating action of the network 46, 47, each of the pulses $P_E$ is converted as above described to a double pulse $P_A$, $P_B$, Figure 3, having a midpoint E corresponding with the peak of pulse $P_E$ from which the double pulse is derived. The double pulses appearing across resistor 47 are applied to the grid circuit of an amplifier tube 48 whose anode is coupled by a blocking condenser 49 to the input terminal 50 of the phase-comparator 22A. The phase-comparator 22A in effect continuously compares the time relation existing between the double pulses $P_A$, $P_B$ supplied by differentiator 18A and the pulses $P_S'$, $P_S''$ supplied by amplifier 21A or equivalent and produces between its output terminals 35, 36 a direct-current voltage which can be measured in determination of the frequency-deviation or which preferably is applied through control line 23A, 23B automatically to control the frequency of oscillator 10.

When the stabilized oscillator is a klystron tube, its frequency may be automatically controlled by the direct-current output of phase-comparator 22 or equivalent by a circuit arrangement such as shown in Figure 4. In brief, the output voltage of the phase-comparator 22A is used as a variable bias for the signal grid of a control tube 55, the resistance of whose anode-cathode path determines the difference of potential between the anode and the cavity grids of a reflex klystron 10A. In the particular arrangement shown, a suitable source of direct-current voltage, exemplified by battery 53, is connected between the cathode and cavity of tube 10A; a resistor 54 is connected between the cavity and the anodes of tubes 10A and 55; and a suitable source of direct current, exemplified by battery 52, is connected between the cathodes of tubes 10A and 55. The potential of the screen grid of control tube 55 may be derived from the source 52 and is stabilized by a regulator tube 56 in series with a resistor 57 across source 52.

The biasing potential applied to the signal grid of control tube 55 comprises two components, one of which is manually adjustable, and the other of which is automatically varied by the frequency-stabilizing system previously described. The manually adjjustable arrangement may include a potentiometer 58 supplied from battery 59 or other suitable direct-current source. Initially, the bias may be manually adjusted to effect operation at the set point frequency and thereafter the automatic stabilizing system described will vary the bias to maintain the frequency precisely constant at set point frequency.

In generally like manner, the output of the phase-comparator may be used to vary the potential of a frequency-control electrode of other types of tubes; for example, reference is made to Figure 4, element 30 of my copending application Serial No. 5,563, filed January 31, 1948.

By way of example, when it is desired to stabilize the oscillator 10 (or 10A) for operation at a frequency of 23,900 megacycles, the (3, 3) line of ammonia may be used as one of the frequency standards, the microwave oscillator 15 may sweep a band of frequencies of from about 23,868 megacycles to above 23,872 megacycles, and the frequency corresponding with point of maximum slope of the differentiator may be 23,900 megacycles. The shape of the modulating wave supplied by modulator 16 may be a sawtooth and the repetition rate may be 1000 cycles. Suitable values for the differentiating network are: capacitor 46—500 mmf; resistor 47—100,000 ohms.

For stabilization of oscillators operating at submicrowave frequencies, a piezo-electric crystal may be used in lieu of gas cell 19, the sweep oscillator will operate over a correspondingly lower range of frequencies including or suitably adjacent the resonant frequency of the crystal, and either the sum or difference frequency of the oscillators 10 and 15 may be used in procurement of the error pulses $P_E$. In all cases, the set point frequency is precisely equal to the algebraic sum of the resonant frequency of a high Q circuit element and the maximum-slope frequency of a filter-differentiator characteristic; there is no variable offset of the set point frequency such as discussed in connection with curves S and S′ of Figure 3.

Although in the system of Figure 1 the pulses containing frequency-error as a function of time information are differentiated for comparison with the undifferentiated pulses derived by sweeping of the gas cell, it shall be understood that the pulses of either of the two trains may be differentiated and the other pulses left undifferentiated.

Figure 5:
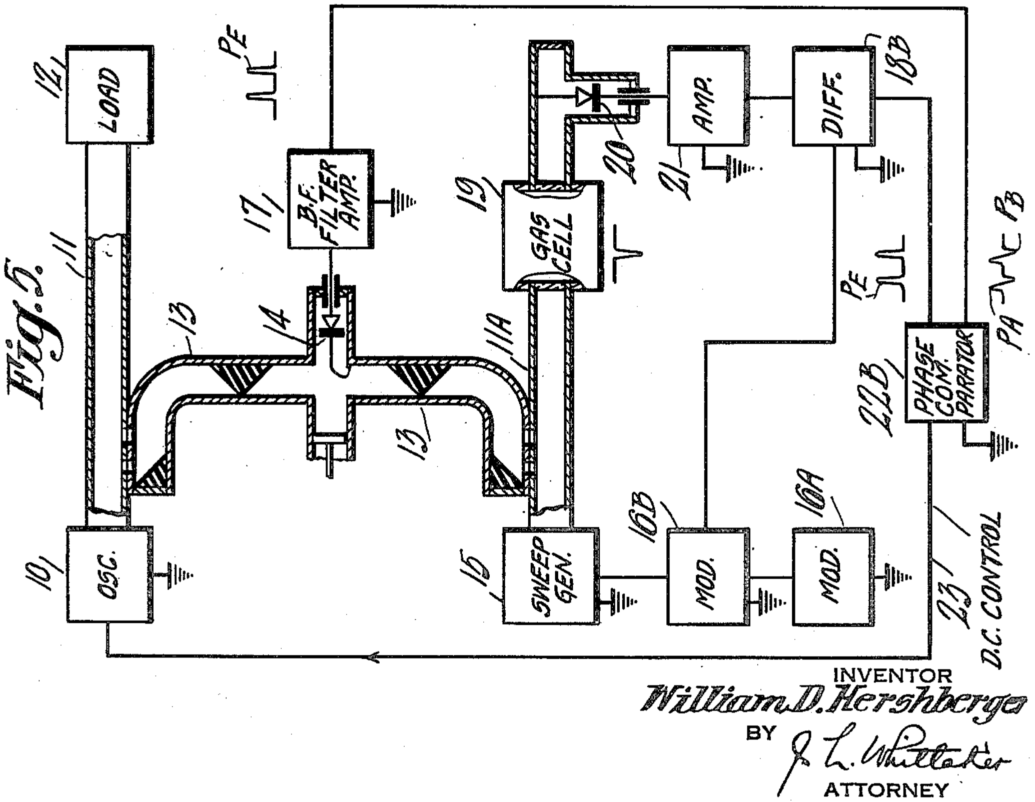
Figure 5 is a block diagram of a modification of the system of Figure 1.

An alternative and generically similar method for stabilizing the frequency of an oscillator is shown in Figure 5. For simplicity of explanation, all components having the same function as components discussed in connection with Figure 1 are identified by the same reference characteristics and therefore, except for points specifically discussed, the description for Figure 1 is applicable for Figure 5.

In the system of Figure 5, the frequency of the sweep generator 15 is swept over a wide band of frequencies at low rate and concurrently is swept over a narrow band of frequencies at high rate. To give a specific example, the modulator 16A may have a repetition rate of one kilocycle and supply a modulating voltage sufficient to vary the frequency of generator 15 over a range of five megacycles; the modulator 16B may have a repetition rate or modulating frequency of 100 kilocycles and supply a modulating voltage sufficient to wobble the frequency of sweep generator 15 over a range of about five kilocycles. The output of the gas cell 19, or equivalent, therefore comprises a train of pulses having a low repetition rate, 1000 per second, corresponding with the frequency of modulator 16A, and the spacing between the pulses is varied at a 100 kilocycle rate corresponding with the frequency of modulator 16B. This train of pulses is impressed upon a receiver 21 whose output is a modulated 100 kilocycle wave. This output and a 100 kilocycle voltage derived from modulator 16B are impressed upon a phase detector 18B.

Referring to Figure 6, the output of receiver 21, which includes rectifier and amplifier circuits tuned to 100 kilocycles, is impressed upon one of the grids of a phase detector tube 60 upon another of whose grids is impressed the 100 kilocycle modulation frequency of modulator 16B. These pulses contain precise frequency-time as a function of information which may be supplied to one input circuit of phase-comparator 22B which may, for example, be of the type shown in Figure 1 of my aforesaid copending application Serial No. 4,497. Upon the other input circuit of the phase-comparator 22B are impressed the train of pulses $P_E$ containing precise-error as a function of time information derived by filter 17 from the varying beat frequency produced by mixing of the outputs of oscillators 10 and 15. As in the preceding systems, the phase-comparator produces a unidirectional control voltage applied to oscillator 10 automatically to hold its frequency at the set point frequency precisely determined by the two trains of pulses respectively supplied to the input circuits of the comparator.

The arrangement shown in Figure 7 is similar to that of Figure 5 except that there is differentiation of the frequency-error as a function of time pulses instead of the frequency as a function of time pulses. Accordingly, it is believed the operation of the system of Figure 7 need not be specifically discussed.

From the foregoing general explanation and specific examples, other generically similar but specifically different arrangements are apparent to those skilled in the art and are within the scope of the appended claims.

What is claimed is:

1. For use in a system for stabilizing the frequency of an oscillator, a circuit comprising means for producing a frequency-stabilizing voltage including a comparator having two input circuits, means including a sharply resonant circuit element and a sweep generator the output of which is applied to said element and the frequency of which recurrently sweeps over the resonant frequency of said element for applying sharp voltage pulses to one of said input circuits, and means for applying a voltage of reversing polarity to the other of said input circuits including a mixer for the outputs of said generator and oscillator, a filter for producing pulses from said mixer output each pulse occurring as the beat-frequency output of said mixer passes through a predetermined beat frequency, and a differentiator for converting each of said last-named pulses to a pair of pulses of abruptly reversing polarity for application to said other comparator input circuit.

2. For use in a system for stabilizing the frequency of a microwave oscillator, a circuit comprising means for producing a frequency-control voltage including a comparator having two input circuits, means for applying to one of said circuits an input pulse signal including a microwave sweep generator and a cell to which the generator output is applied and containing gas exhibiting molecular resonance at a frequency within the sweep range of said generator to produce said input pulse signal, and means for applying to the other of said circuits an input signal including means producing a beat-frequency varying as the difference of the oscillator and sweep-generator frequencies, a filter for producing pulses each occurring as said beat-frequency passes a predetermined frequency, and a differentiator for converting said last-named pulses to pulses of abruptly reversing polarity for application to said other input circuit of the comparator.

3. For use in a system for stabilizing the frequency of an oscillator, a circuit comprising a sweep generator, a sharply resonant circuit element swept by the output of said generator to produce a series of recurrent pulses, means for mixing the outputs of said oscillator and sweep generator to produce a varying beat-frequency, a filter for deriving from said beat-frequency a second series of recurrent pulses, differentiator means for converting the pulses of one of said series to double pulses of abruptly reversing polarity, and a comparator for producing a stabilizing voltage for said oscillator having two input circuits, upon one of which said double pulses are impressed and upon the other of which is impressed the other of said series of pulses.

4. For use in a system for stabilizing the frequency of an oscillator, a circuit comprising a sweep generator, a sharply resonant circuit element swept by the output of said generator to produce a series of recurrent pulses, means for mixing the outputs of said oscillator and sweep generator to produce a varying beat-frequency, a filter for deriving from said beat-frequency a second series of recurrent pulses, a resistance-capacitance differentiator for converting the pulses of one of said series to double pulses of abruptly reversing polarity, and a comparator for producing a stabilizing voltage for said oscillator having two input circuits, upon one of which said double pulses are impressed and upon the other of which is impressed the other of said series of pulses.

5. For use in a system for stabilizing the frequency of an oscillator, a circuit comprising a sweep generator, modulating means for concurrently varying the frequency of said generator over a wide band at low frequency and over a narrow band at high frequency, a sharply resonant circuit element swept by the output of said generator to produce a series of recurrent pulses whose repetition rate corresponds with said low modulating frequency and whose time spacing varies at said high modulating frequency, a mixer for the outputs of said oscillator and sweep generator to produce a beat-frequency varying at said low frequency and modulated at said high frequency, a filter for deriving from said beat-frequency a second series of pulses whose repetition rate and spacing respectively correspond with said low and high modulating frequencies respectively, a differentiator to which one of said series of pulses and said modulating frequencies are applied to produce pulse pairs having abrupt polarity transitions at said low frequency, and a comparator having two input circuits, upon one of which said pulse pairs are impressed and upon the other of which is impressed the other of said series of pulses.

6. A method of stabilizing the frequency of an oscillator which comprises repeatedly sweeping through the resonant frequency of a standard with the varying frequency of a second oscillator to produce a series of pulses, mixing the frequencies of said oscillators to produce a varying beat-frequency, producing a second series of pulses each occurring as the beat-frequency passes through a predetermined value, differentiating the pulses of one of said series, and varying a frequency-control of said first oscillator to maintain a fixed time relation of the points of maximum slope of the differentiated pulses to the peaks of the pulses of the other series.

7. A method of stabilizing the frequency of an oscillator which comprises sweeping through the resonant frequency of a standard with the varying frequency of a second oscillator to produce a series of pulses, mixing the frequencies of said oscillators to produce a varying beat-frequency, producing a second series of pulses each occurring as the beat-frequency passes through a preselected frequency, differentiating the second series of pulses to produce pulse pairs, one pair for each pulse of said second series containing precise frequency-error as a function of time information, and varying a frequency-control of said first oscillator to maintain a fixed time relation of the peaks of the first series of pulses to the midpoint of the pulse pairs.

8. A method of stabilizing the frequency of an oscillator which comprises sweeping through the resonant frequency of a standard with the varying frequency of a second oscillator to produce a series of pulses, mixing the outputs of said oscillators to produce a varying beat-frequency, producing a second series of pulses each occurring as the beat-frequency passes through a preselected frequency, differentiating said first series of pulses to produce pulse-pairs, and varying a frequency-control of said first oscillator to maintain a fixed time relation of the peaks of said second series of pulses to the midpoint of the pulse pairs.

9. A method of stabilizing the frequency of an oscillator which comprises varying the frequency of a second oscillator over a wide band at low frequency and over a narrow band at high frequency, impressing the output of said second oscillator upon a high Q frequency standard to produce a continuous train of pulses recurring at said low frequency with time spacing varying at said high frequency, mixing the outputs of said oscillators to produce a beat-frequency, producing a pulse each time said beat-frequency passes through a preselected value to provide a second train of pulses also recurring at said low frequency with time spacing varying at said high frequency, differentiating the pulses of one of said trains to derive pulse-pairs therefrom, and varying a frequency-control of said first oscillator to maintain a fixed time relation of the midpoints of the pulse-pairs derived from said one of said trains to the peaks of the pulses of the other train.

10. A method of stabilizing the frequency of an oscillator which comprises varying the frequency of a second oscillator over a wide band at low modulating frequency and over a narrow band at high modulating frequency, impressing the output of said second oscillator upon a high Q standard to produce a continuous train of pulses which recur at said low frequency with time spacing varying at said high frequency, combining said pulses and said high modulating frequency by phase comparison to produce a train of pulse-pairs, mixing the outputs of said oscillators to produce a beat-frequency varying with a certain frequency deviation at said low frequency and wobbled with a lower frequency deviation at said high frequency, producing a second train of pulses each occurring as said beat-frequency passes through a preselected fixed value, and varying a frequency-control of said first oscillator to maintain fixed relation of the peaks of the pulses of the second train to the midpoints of said pulse-pairs.

11. A method of stabilizing the frequency of a microwave oscillator with respect to the molecular resonant frequency of a gas which comprises sweeping a confined body of said gas with the varying frequency of a microwave sweep oscillator so as to produce a train of pulses, mixing the frequencies of said oscillators to produce a varying beat-frequency, producing a second train of pulses each occurring as said beat-frequency passes through a preselected fixed value, differentiating the pulses of one of said trains, and varying a frequency-control of said first oscillator to maintain a fixed time relation of the points of maximum slope of the differentiated pulses to the peaks of the pulses of the other train.

12. A method of stabilizing the frequency of a microwave oscillator with respect to the molecular resonant frequency of a gas which comprises sweeping a confined body of said gas with the varying frequency of a microwave sweep oscillator so as to produce a train of pulses, mixing the frequencies of said oscillators to produce a varying beat-frequency, filtering said beat-frequency to produce a second train of pulses whose repetition rate corresponds with the sweep rate of the second-named oscillator, differentiating the pulses of said second train to produce double pulses of abruptly reversing polarity, and varying a frequency-control of said first oscillator to maintain a fixed time relation of the peaks of the pulses of the first train to the polarity transition points of said double pulses.

13. A method of stabilizing the frequency of a microwave oscillator with respect to the molecular resonant frequency of a gas which comprises sweeping a confined body of said gas with the varying frequency of a microwave sweep oscillator to produce a train of pulses, mixing the frequencies of said oscillators to produce a varying beat-frequency, producing a second train of pulses each occurring as said beat-frequency passes through a preselected fixed value, differentiating the pulses of one of said trains, and producing a frequency-control voltage for said first oscillator which is varied by and in accordance with variation of the time relation between the points of maximum slope of the differentiated pulses to the peaks of the pulses of the other train.

14. A method of stabilizing the frequency of a microwave oscillator with respect to the molecular resonant frequency of a gas which comprises sweeping a confined body of said gas with the varying frequency of a microwave sweep oscillator to produce a train of pulses, mixing the frequencies of said oscillators to produce a varying beat-frequency, producing a second train of pulses each occurring as said beat-frequency passes through a preselected fixed value, differentiating the pulses of the second train, and producing a frequency-control voltage for said first oscillator which is varied by and in accordance with variation of the time relation between the peaks of the pulses of the first train and the points of maximum slope of the differentiated pulses.

References Cited in the file of this patent

UNITED STATES PATENTS

| | | |
|---|---|---|
| 2,576,652 | Sziklai et al. | Nov. 27, 1951 |
| 2,591,257 | Hershberger | Apr. 1, 1952 |